(12) United States Patent
Urvas

(10) Patent No.: US 8,363,750 B2
(45) Date of Patent: Jan. 29, 2013

(54) APPARATUS, METHOD AND COMPUTER PROGRAM FOR ERROR COMPENSATION

(75) Inventor: Ilkka Urvas, Espoo (FI)

(73) Assignee: Nokia Corporation, Espoo (FI)

( * ) Notice: Subject to any disclaimer, the term of this patent is extended or adjusted under 35 U.S.C. 154(b) by 1004 days.

(21) Appl. No.: 12/081,188

(22) Filed: Apr. 11, 2008

(65) Prior Publication Data

US 2009/0180575 A1    Jul. 16, 2009

(30) Foreign Application Priority Data

Jan. 14, 2008    (FI) .................................... 20085026

(51) Int. Cl.
*H04K 1/02*    (2006.01)

(52) U.S. Cl. ........ 375/296; 375/260; 375/295; 375/302; 375/316; 375/322

(58) Field of Classification Search .................. 375/219, 375/223, 224, 243, 254, 260, 271, 295, 296, 375/297, 302, 309, 322, 326, 344, 346, 371
See application file for complete search history.

(56) References Cited

U.S. PATENT DOCUMENTS

| 5,867,059 A * | 2/1999 | Huang et al. ................... 329/302 |
| 6,724,331 B1 * | 4/2004 | El-Ghoroury et al. ......... 341/118 |
| 7,675,983 B2 * | 3/2010 | Gorday et al. ................. 375/260 |
| 2004/0082305 A1 * | 4/2004 | Kirschenmann et al. .. 455/232.1 |
| 2005/0260949 A1 * | 11/2005 | Kiss et al. ................... 455/67.14 |
| 2007/0109046 A1 * | 5/2007 | Duperray ....................... 330/149 |
| 2007/0201351 A1 * | 8/2007 | Egashira et al. .............. 370/208 |
| 2008/0063113 A1 * | 3/2008 | Gao et al. ...................... 375/296 |
| 2010/0034250 A1 * | 2/2010 | O'Leary et al. ............... 375/229 |

* cited by examiner

*Primary Examiner* — Hirdepal Singh
(74) *Attorney, Agent, or Firm* — Squire Sanders (US) LLP

(57) ABSTRACT

The invention is related to an apparatus which includes a first generator configured to generate transfer function values of in-phase and quadrature channels. The apparatus further includes a determiner configured to determine compensation coefficients on the basis of the generated transfer function values of in-phase and quadrature channels. The apparatus further includes a second generator configured to generate compensated frequency domain symbols for at least one frequency pair by using the compensation coefficients.

28 Claims, 2 Drawing Sheets

APPARATUS, METHOD AND COMPUTER PROGRAM FOR ERROR COMPENSATION

CROSS REFERENCE TO RELATED APPLICATION

This application claims priority to Finnish Patent Application Serial No. 20085026 filed Jan. 14, 2008 in Finland. The subject matter of the earlier filed application is hereby incorporated by reference.

FIELD OF THE INVENTION

The invention relates to an apparatus, method and computer program for error compensation.

BACKGROUND OF THE INVENTION

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Direct conversion IQ-modulators are widely used in wireless communication transmitters to convert base band signals to radio frequency, since they are well suited to be implemented with integrated circuits.

Direct conversion IQ-modulators typically generate unwanted spectrum components in an up-converted signal due to the distortion in preceding transmitter stages and/or non-idealities caused by asymmetrical layout, for example. This leads to imbalance in quadrature channels, which results in unwanted image components in a modulator output. Additionally, an unwanted direct current (DC) offset at the modulator input causes leakage of a radio frequency (RF) local oscillator signal.

The unwanted leakage signals deteriorate signal-to-noise ratio of a signal at a receiver, thus limiting the efficiency of data transmission.

BRIEF DESCRIPTION OF THE INVENTION

According to an aspect of the present invention, there is provided an apparatus as specified in claim 1 or 21.

According to another aspect of the present invention, there is provided a method as specified in claim 9. According to another aspect of the present invention, there is provided a computer program as specified in claim 15.

LIST OF DRAWINGS

Figure 1:
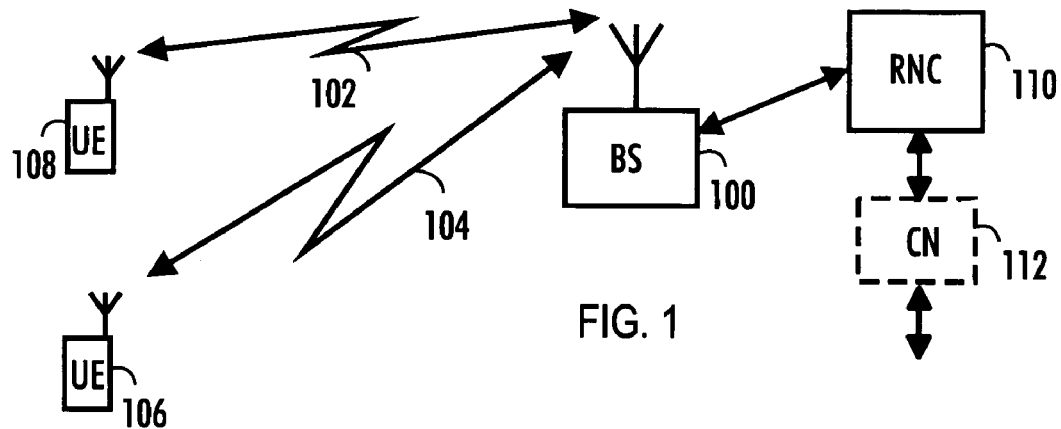
Figure 2:
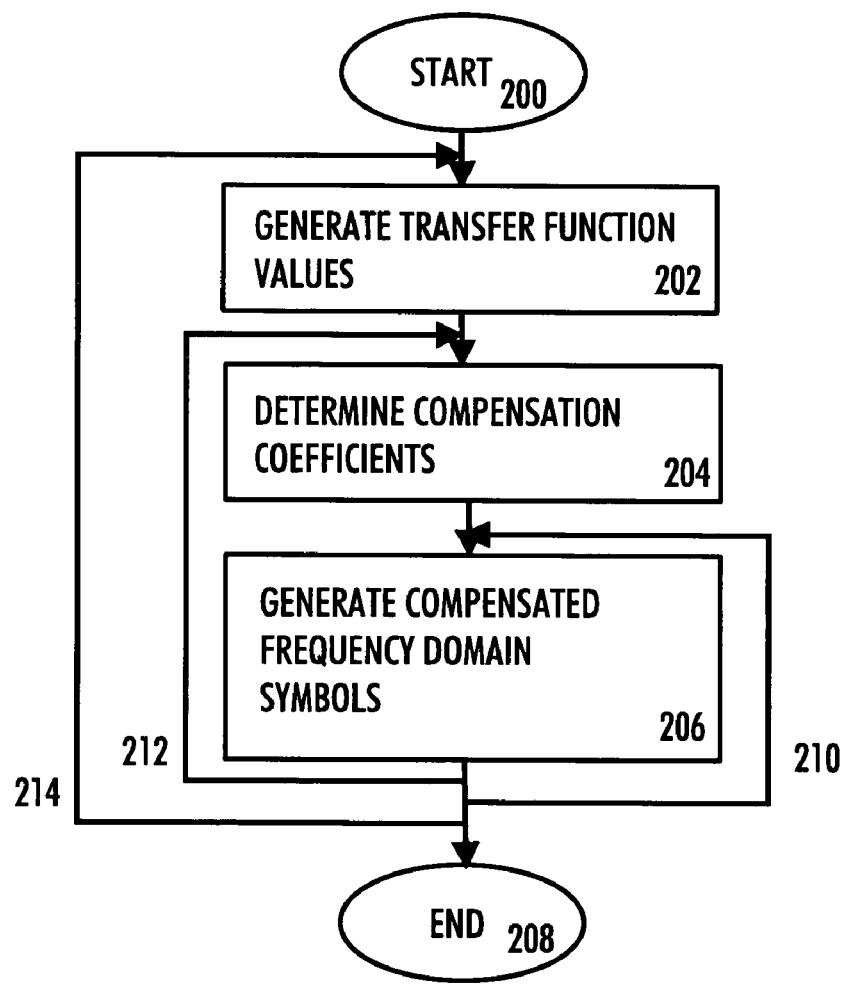
Figure 3:
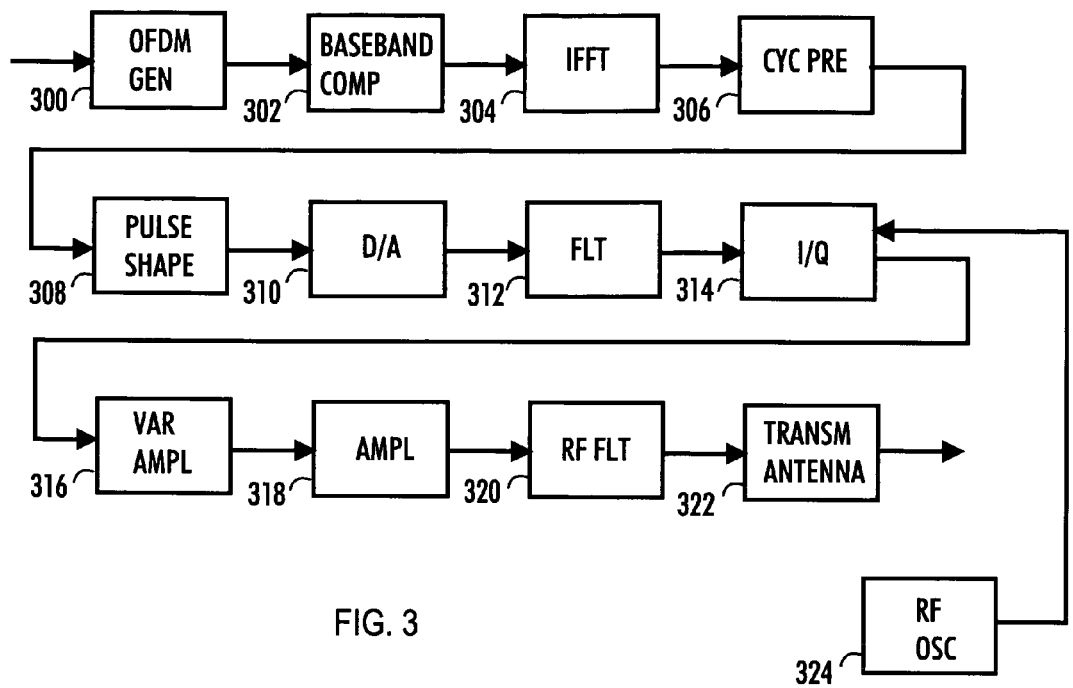
Figure 4:
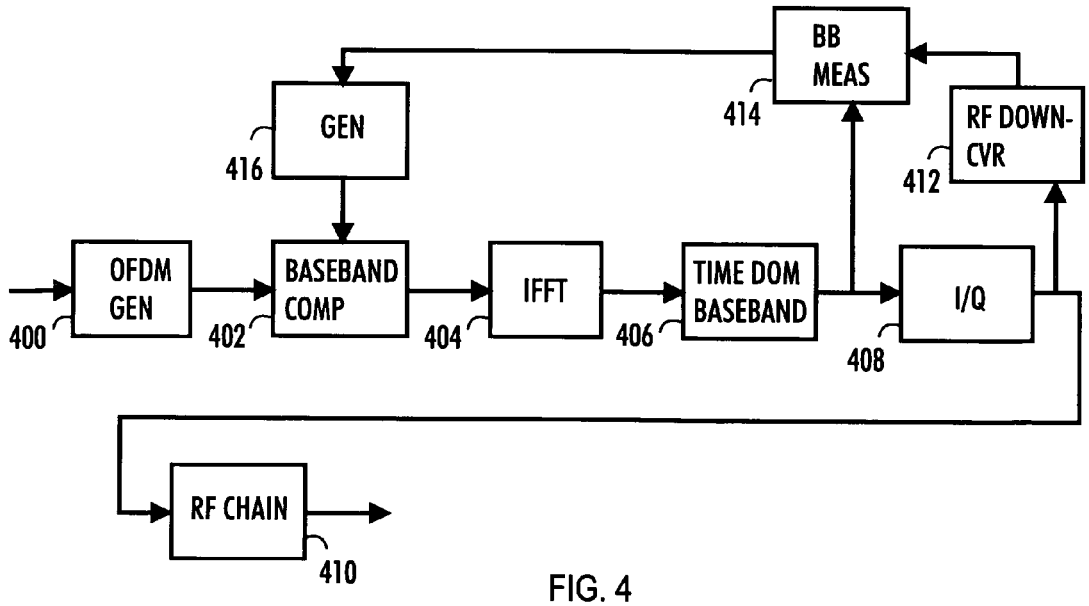

Embodiments of the present invention are described below, by way of example only, with reference to the accompanying drawings, in which FIG. 1 illustrates an example of a communications system;
FIG. 2 is a flow chart;
FIG. 3 illustrates an example of an OFDM transmitter; and
FIG. 4 illustrates another example of an OFDM transmitter.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any user terminal, server, corresponding component, and/or to any communication system or any combination of different communication systems that support required functionality. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on Evolved UMTS terrestrial radio access (E-UTRA, UMTS=Universal Mobile Telecommunications System) without restricting the embodiment to such an architecture, however.

Many different radio protocols to be used in communications systems exist. Some examples of different communication systems are the Universal Mobile Telecommunications System (UMTS)-radio access network (UTRAN or E-UTRAN (Long Term Evolution)), Global System for Mobile Communications (GSM) and its modifications, Wireless Local Area Network (WLAN), Worldwide Interoperability for Microwave Access (WiMAX), Bluetooth®, Personal Communications Services (PCS) and systems using ultra-wideband (UWB) technology.

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication are irrelevant to the actual invention. Therefore, they need not be discussed in more detail here.

FIG. 1 shows a part of a radio access network of E-UTRA.

The communications system is a cellular radio system which comprises a base station (or node B) 100, which has bi-directional radio links 102 and 104 to user devices 106 and 108. The user devices may be fixed, vehicle-mounted or portable. The user devices 106 and 108 may refer to portable computing devices. Such computing devices include wireless mobile communication devices operating with or without a subscriber identification module (SIM), including, but not limited to, the following types of devices: mobile phone, multimedia device, personal digital assistant (PDA), handset.

The base station includes transceivers, for instance. From the transceivers of the base station, a connection is provided to an antenna unit that establishes bi-directional radio links to the user devices. The base station is further connected to a controller 110, a radio network controller (RNC), which transmits the connections of the devices to the other parts of the network. The radio network controller controls in a centralized manner several base stations connected to it. The radio network controller is further connected to a core network 112 (CN). Depending on the system, the counterpart on the CN side can be a mobile services switching center (MSC), a media gateway (MGW) or a serving GPRS (general packet radio service) support node (SGSN), etc.

It should be noted that in future radio networks, the functionality of an RNC may be distributed among (possibly a subset of) base stations.

The embodiments are not, however, restricted to the system given as an example but a person skilled in the art may apply the solution to other communication systems provided with the necessary properties. Different radio protocols may be used in the communication systems in which embodiments of the invention are applicable. The radio protocols used are not relevant regarding the embodiments of the invention.

The communication system is also able to communicate with other networks, such as a public switched telephone network or the Internet.

Direct conversion IQ-modulators are widely used in wireless communication transmitters to convert base band signals to radio frequency, since they are well suited to be implemented with integrated circuits.

Direct conversion IQ-modulators typically generate unwanted spectrum components in an up-converted signal due to the distortion in preceding transmitter stages. Imbalance between the in-phase and quadrature channel results in leaked image components at the modulator output. Additionally, an unwanted direct current (DC) offset at the modulator input causes leakage of a radio frequency (RF) local oscillator signal.

Signal processing is typically implemented based on an assumption that In-phase (I) and Quadrature (Q) channels have similar amplitude and phase characteristics. It is also presumed that no local oscillator (LO) feedthrough exists. However, in practice, an unwanted direct current (DC) component at the base band input or phase error between LO signals generates LO leakage at the modulator output and the amplitude and phase errors produce interference in the form of unwanted image components. No prior art method is provided which could compensate for frequency dependent distortion of base band circuits.

In an embodiment of the invention, a base band signal is processed in the frequency domain that is prior to conversion to the time domain. For this purpose, transfer functions of I and Q channels in base band are defined as a function of frequency, for instance by measuring a test signal.

A base band signal can be thought to include negative frequency components, a zero frequency component, that is a DC component and positive frequency components. When the signal is converted to a radio frequency, the DC component is on a carrier frequency, the negative components are below it and the positive components are above it.

Due to imperfections, negative frequency components leak to their positive counterparts and vice versa. In order to get a signal where influence of imperfections is at least partly compensated, positive and negative frequency components are calculated. Thus input signals are re-calculated based on the imperfections, in other words new inputs to Inverse Fast Fourier Transform (IFFT) unit are calculated.

The embodiment uses the I and Q transfer functions to determine correction coefficients for the wanted and an image frequency component of the signal. The correction coefficients are used to modify the original signal for obtaining a compensated signal to be used as an input to the time domain base band stage. The modification will result in an improved waveform at a base band output, i.e. at an I/Q modulator. Thus LO leakage and the image frequency component are suppressed to at least a level on which they do not excessively distort a signal to be transmitted. The embodiment is thus able to compensate for frequency dependent distortion of base band circuits.

Next, an embodiment of the method is explained in further detail by means of FIG. 2. The embodiment starts in block 200.

One frequency domain symbol, i.e. a single input symbol of Inverse Fast Fourier Transform (IFFT) may be regarded to consist of quadrature sample pairs I and Q:

$$S = \begin{bmatrix} I_n + i \cdot Q_n \\ I_{n-1} + i \cdot Q_{n-1} \\ \ldots \\ I_1 + i \cdot Q_1 \\ I_0 + i \cdot Q_0 \\ I_{-1} + i \cdot Q_{-1} \\ \ldots \\ I_{-n+1} + i \cdot Q_{-n+1} \\ I_{-n} + i \cdot Q_{-n} \end{bmatrix}, \quad (1)$$

wherein
i denotes an imaginary unit,
I denotes a real part of a sample,
Q denotes an imaginary part of a sample, and
n=0 denotes a direct current (DC) component, negative values of n denote negative frequency components and positive values of n denote positive frequency components. DC-subcarrier may not be used, in which case the symbol S does not include components with value n=0.

Fourier transform (or Discrete Fourier Transform, DFT) is typically implemented by using Fast Fourier Transform (FFT). Fourier transform, FFT and DFT are presented in literature, for instance in Proakis, John G. and Manolakis, Dimitris G.: Introduction to Digital Signal Processing, 1988, Macmillan Publishing Company, pages 241-247(discrete-time aperiodic signals), 286-288 and 682-690(DFT), 689-730(FFT). It should be noticed that these transforms may also be used for transformations from the frequency domain to the time domain.

In principle, a base band signal in a time domain experiences gain and a phase shift as a function of the base band frequency. In the time domain, negative components of the frequency domain signal experience the same gain and phase shift as the positive components.

The I and Q channel performance of analog base band may have slightly different amplitude and phase characteristics due to asymmetry and imperfections of analog components. Amplitude imbalance and phase quadrature error between the I and Q channel signals tend to result in unwanted image components at the modulator output. Additionally, if local oscillator signals are not in quadrature, the modulator will generate unwanted LO leakage component.

The gain and phase imbalance between I and Q channels as well as the imperfect quadrature of local oscillator signals may be compensated by modifying frequency domain inputs of the IFFT.

In the following, an analysis is shown for a single positive/negative input frequency pair. It should be noticed that a common I/Q gain error is not the target of the analysis. It may be compensated simply by dividing each frequency component pair by the gain error at the base band-frequency. Correspondingly, the common phase error may be compensated by phase rotating complex IFFT inputs of a signal of one channel (I or Q) by the amount of the phase error having an opposite sign.

In block 202, transfer function values of in-phase and quadrature channels are generated. A plurality of options to generate transfer function values exist. One of them is to configure a transmitter to provide a test signal that consists of a single sub-carrier or a combination of sub-carriers. It is also possible to use transmitted data. The measurement may be objected to I and Q channel characteristics or the difference between I and Q signal components.

Amplitude and frequency response for a transfer function may be determined by measuring in-phase and quadrature parts of a signal at base band, that is at a modulator input, or by measuring a radio frequency signal in which case the signal is down-converted or sampled to a base band frequency. The measurement may be objected to I and Q channel characteristics or the difference between I and Q signal components.

The signal to be measured does not have to be in an I/Q format, if a specific test signal is used. The measurements may be carried out when the receiver is not used for signal reception, or if the receiver is used in a normal manner, the measurements may be carried out by using a diversity receiver or a circuit dedicated to the measurements.

In block 204, compensation coefficients are determined on the basis of the generated transfer function values of in-phase and quadrature channels.

A part of a compensated symbol with a positive and negative frequency component in the IFFT input may be expressed as follows:

$$x_n = e^{-ib_n}(iD_n + C_n) + e^{ib_n}(iB_{-n} + A_{-n}) \quad (2)$$

wherein e is a Neper's constant, i denotes an imaginary unit, n denotes a frequency component of an available spectrum (see equation 1), $A_{-n}$ denotes a real part of a negative frequency component of a compensated symbol, $B_{-n}$ denotes an imaginary part of the negative frequency component of a compensated symbol, $C_n$ denotes a real part of a positive frequency component of a compensated symbol, $D_n$ denotes an imaginary part of the positive frequency component of a compensated symbol, and $b_n$ denotes a base band frequency component $2\pi f_{BB,n} t$, wherein $f_{BB,n}$ denotes a baseband frequency and t denotes time.

It should be noticed that equation (2) depicts only two sub-carriers, the absolute values of which are on a same frequency but one is positive and other negative. The equation can be generalised, for instance to an Orthogonal Frequency Division Multiplex (OFDM) symbol, by constructing frequency components with sub-carrier pairs and, if needed, with a DC-sub-carrier.

A real part of the IFFT output that is an I channel (in-phase) signal may be written as follows:

$$I_n = \sin(b_n)D_n + \cos(b_n)C_n - \sin(b_n)B_{-n} + \cos(b_n)A_{-n}, \quad (3)$$

wherein $A_{-n}$ denotes a real part of a negative frequency component of a compensated symbol, $B_{-n}$ denotes an imaginary part of the negative frequency component of a compensated symbol, $C_n$ denotes a real part of a positive frequency component of a compensated symbol, $D_n$ denotes an imaginary part of the positive frequency component of a compensated symbol, $b_n$ denotes a base band frequency component $2\pi f_{BB,n} t$, wherein $f_{BB,n}$ denotes a baseband frequency and t denotes time, and n denotes a frequency component of an available spectrum (see equation (1)).

An imaginary part that is a Q-channel (quadrature) signal may be written as follows:

$$Q_n = (\cos(h_n + b_n)D_n - \sin(h_n + b_n)C_n + \cos(h_n + b_n)B_{-n} + \sin(h_n + b_n)A_{-n})G_n \quad (4)$$

wherein $A_{-n}$ denotes a real part of a negative frequency component of a compensated symbol, $B_{-n}$ denotes an imaginary part of the negative frequency component of a compensated symbol, $C_n$ denotes a real part of a positive frequency component of a compensated symbol, $D_n$ denotes an imaginary part of the positive frequency component of a compensated symbol, $b_n$ denotes a base band frequency component $2\pi f_{BB,n} t$, $h_n$ denotes a base band phase difference between $I_n$ and $Q_n$ signal components (h=phase$_I$–phase$_Q$), $G_n$ denotes a gain difference between $I_n$ and $Q_n$ signal components (G=G$_{(Q)}$/G$_{(I)}$), and n denotes a frequency component of an available spectrum (see equation (1)).

A part of a symbol with positive and negative frequency component at a modulator output may be as follows:

$$RF_n = (\cos(h_n + b_n)\sin(r+d)D_n - \sin(h_n + b_n)\sin(r+d)C_n + \cos(h_n + b_n)\sin(r+d)B_{-n} + \sin(h_n + b_n)\sin(r+d)A_{-n})G_n + \sin(b_n)\cos(r)D_n + \cos(b_n)\cos(r)C_n - \sin(b_n)\cos(r)B_{-n} + \cos(b_n)\cos(r)A_{-n}, \quad (5)$$

wherein $A_{-n}$ denotes a real part of a negative frequency component of a compensated symbol, $B_{-n}$ denotes an imaginary part of the negative frequency component of a compensated symbol, $C_n$ denotes a real part of a positive frequency component of a compensated symbol, $D_n$ denotes an imaginary part of the positive frequency component of a compensated symbol, $b_n$ denotes a base band frequency component $2\pi f_{BB,n} t$, $h_n$ denotes a base band phase difference between $I_n$ and $Q_n$ signal components (h=phase$_I$–phase$_Q$), n denotes a frequency component of an available spectrum (see equation (1)), r denotes radio frequency (RF) oscillator frequency $2\pi f_{RF} t$, and d denotes a phase error between oscillator signals.

An ideal (undistorted) modulator output may be expressed as follows:

$$RF_{ideal,n} = (\cos(b_n)Q_n + \cos(b_n)Q_{-n} - \sin(b_n)I_n + \sin(b_n)I_{-n})\sin(r) + (\sin(b_n)Q_n - \sin(b_n)Q_{-n} + \cos(b_n)I_n + \cos(b_n)I_{-n})\cos(r), \quad (6)$$

wherein $b_n$ denotes a base band frequency component $2\pi f_{BB,n} t$, r denotes radio frequency (RF) oscillator frequency $2\pi f_{RF} t$, $I_{-n}$ denotes a real part of a negative frequency component (uncompensated), $Q_{-n}$ denotes an imaginary part of a negative frequency component (uncompensated), $I_n$ denotes a real part of a positive frequency component (uncompensated), $Q_n$ denotes an imaginary part of a positive frequency component (uncompensated), and n denotes a frequency component of an available spectrum (see equation (1)).

Solving $RF_n = RF_{ideal,n}$ gives IFFT input values that result in compensated I/Q-modulator output.

Real and imaginary parts of frequency components of a compensated symbol (direct current frequency components excluded) may be represented as follows for a single positive-negative IFFT frequency pair:

$$A_{-n} = -(((\sin(d)*\sin^2(h_n)+\sin(d)*\cos^2(h_n))*Q_n+(\sin(d)*\sin^2(h_n)+\sin(d)*\cos^2(h_n))*Q_{-n}+(-\cos(d)*\sin^2(h_n)-\cos(d)*\cos^2(h_n))*I_n+(-\cos(d)*\sin^2(h_n)-\cos(d)*\cos^2(h_n))*I_{-n})*G_n-\sin(h_n)*Q_n-\sin(h_n)*Q_{-n}+\cos(h_n)*I_n-\cos(h_n)*I_{-n})$$

$$B_{-n} = -(((\cos(d)*\sin^2(h_n)+\cos(d)*\cos^2(h_n))*Q_n+(-\cos(d)*\sin^2(h_n)-\cos(d)*\cos^2(h_n))*Q_{-n}+(\sin(d)*\sin^2(h_n)+\sin(d)*\cos^2(h_n))*I_n+(-\sin(d)*\sin^2(h_n)-\sin(d)*\cos^2(h_n))*I_{-n})*G_n-\cos(h_n)*Q_n-\cos(h_n)*Q_{-n}-\sin(h_n)*I_n+\sin(h_n)*I_{-n})$$

$$C_n = -(((\sin(d)*\sin^2(h_n)+\sin(d)*\cos^2(h_n))*Q_n+(\sin(d)*\sin^2(h_n)+\sin(d)*\cos^2(h_n))*Q_{-n}+(-\cos(d)*\sin^2(h_n)-\cos(d)*\cos^2(h_n))*I_n+(-\cos(d)*\sin^2(h_n)-\cos(d)*\cos^2(h_n))*I_{-n})*G_n+\sin(h_n)*Q_n+\sin(h_n)*Q_{-n}-\cos(h_n)*I_n+\cos(h_n)*I_{-n})$$

$$D_n = (((\cos(d)*\sin^2(h_n)+\cos(d)*\cos^2(h_n))*Q_n+(-\cos(d)*\sin^2(h_n)-\cos(d)*\cos^2(h_n))*Q_{-n}+(\sin(d)*\sin^2(h_n)+\sin(d)*\cos^2(h_n))*I_n+(-\sin(d)*\sin^2(h_n)-\sin(d)*\cos^2(h_n))*I_{-n})*G_n+\cos(h_n)*Q_n+\cos(h_n)*Q_{-n}+\sin(h_n)*I_n-\sin(h_n)*I_{-n}) \quad (7)$$

wherein $I_{-n}$ denotes a real part of a negative frequency component (uncompensated), $Q_{-n}$ denotes an imaginary part of a negative frequency component (uncompensated), $I_n$ denotes a real part of a positive frequency component (uncompensated), and $Q_n$ denotes an imaginary part of a positive frequency component (uncompensated), d denotes a phase error between oscillator signals, $h_n$ denotes a base band phase difference between $I_n$ and $Q_n$ signal components (h=phase$_I$–phase$_Q$), $G_n$ denotes a gain difference between $I_n$ and $Q_n$ signal components (G=G$_{(Q)}$/G$_{(I)}$), and n denotes a frequency component of an available spectrum (see equation (1)).

Variables $G_n$ and $h_n$ depend on a base band frequency whereas constant d depends on a local oscillator frequency. The local oscillator frequency is constant for a symbol, thus d is also constant over a symbol.

In practice, local oscillator compensation is not needed, in which case the equations shown above may be simplified.

Typically, if the local oscillator compensation is used, the value d is determined for each operating RF band of a transmitter.

As image rejection of a transmitter is a function of frequency, it may occur that some or even most of unwanted components nevertheless fulfil the requirements of the specification. In such a case, another option for compensation exists: only frequency components not fulfilling the requirements may be compensated. This will save computational resources.

It should be noticed that the equations above are not valid for a direct current component, since it, as a single input complex value, consists of only a single frequency component. Thus, compensated frequency domain symbols may also be generated for a single frequency component located between the at least one frequency pair.

A modulator output may be defined as follows:

$$RF_0 = \sin(r+d)F*G_0 + \cos(r)E, \quad (8)$$

wherein r denotes radio frequency (RF) oscillator frequency $2\pi f_{RF}t$, d denotes a phase error between oscillator signals, $G_0$ denotes DC gain difference between $I_0$ and $Q_0$ signals (G=G$_{(Q)}$/G$_{(I)}$), E denotes a real part of the IFFT input at a frequency of a direct current component, and F denotes an imaginary part of the IFFT input at a frequency of a direct current component.

An ideal (undistorted) modulator output may be expressed as follows:

$$RF_{ideal,0} = \sin(r)Q_0 + \cos(r)I_0, \quad (9)$$

wherein r denotes radio frequency (RF) oscillator frequency $2\pi f_{RF}t$, $Q_0$ denotes an imaginary part of the IFFT input at a frequency of a direct current component (uncompensated), and $I_0$ denotes a real part of the IFFT input at a frequency of a direct current component (uncompensated).

Solving $RF_0 = RF_{ideal,0}$ gives IFFT input values that result in compensated I/Q-modulator output.

Real and imaginary parts of a direct current frequency component of a compensated symbol may be represented as follows:

$$E = \frac{\sin(d)Q_0 - \cos(d)I_0}{\cos(d)}, \quad (10)$$

$$F = \frac{Q_0}{\cos(d)G_0},$$

wherein d denotes a phase error between oscillator signals, $Q_0$ denotes an imaginary part of the IFFT input at a frequency of a direct current component (uncompensated), $I_0$ denotes a real part of the IFFT input at a frequency of a direct current component (uncompensated), and $G_0$ denotes a gain difference between $I_0$ and $Q_0$ signals (G=G$_{(Q)}$/G$_{(I)}$).

Real and imaginary parts of frequency components of a compensated symbol may be impractical to calculate with the equations above. A possibility to use approximations of the equations or look-up tables to generate compensation variables that are used to calculate the IFFT input values exists.

The calculation on values A to F needs to be carried out separately for each symbol. It is more practical to calculate fixed coefficients for those parts of equations (7) and (10) that do not change from one symbol to another. Corresponding equations may be expressed as follows:

$$A_{-n} = c_{1,n}I_n + c_{2,n}I_{-n} + c_{3,n}Q_n + c_{4,n}Q_{-n}$$

$$B_{-n} = c_{5,n}I_n + c_{6,n}I_{-n} + c_{7,n}Q_n + c_{8,n}Q_{-n}$$

$$C_{-n} = c_{9,n}I_n + c_{10,n}I_{-n} + c_{11,n}Q_n + c_{12,n}Q_{-n}$$

$$D_{-n} = c_{13,n}I_n + c_{14,n}I_{-n} + c_{15,n}Q_n + c_{16,n}Q_{-n}$$

$$E = c_{0,1}I_{dc} + c_{0,2}Q_{dc}$$

$$F = c_{0,3}I_{dc} + c_{0,4}Q_{dc} \quad (11)$$

The equation (11) is a generalisation of equations (7) and (10), wherein $I_n$ denotes a real part of a negative frequency component (uncompensated), $Q_n$ denotes an imaginary part of a negative frequency component (uncompensated), $I_{-n}$ denotes a real part of a positive frequency component (uncompensated), and $Q_{-n}$ denotes an imaginary part of a positive frequency component (uncompensated), $Q_0$ denotes an imaginary part of the IFFT input at a frequency of a direct current component (uncompensated), $I_0$ denotes a real part of the IFFT input at a frequency of a direct current component (uncompensated), n denotes a frequency component of an available spectrum (see equation (1)), and $c_{x,n}$ denotes compensation coefficients.

Compensation coefficients c represent values that are typically constant from one symbol to another. These constant values may be updated in block 204 if non-idealities of a transmitter chain change as a function of time. One option to define compensation coefficients of equation (11) is by using the solution of equation (7)=equation (11) and equation (10). For example, value A of equation (11)=value A of equation (7), etc. It is possible to use approximations of some of the terms of equations (7) and (10) instead of the exact forms stated herein. Other possibilities also exist.

Constant values may also be updated in the case the transfer function changes. Then the new transfer function is determined and the constant values are updated.

A DC component may be gain scaled in a similar manner than other frequency components.

It should be noticed that in practice, typically, compensation coefficients are determined by using measured in-phase and quadrature channel responses (absolute or relative) and a phase-error between local oscillator signals. Thus in practical implementations, the compensation coefficients may be a function of at least one of: an amplitude response of an in-phase channel, phase response of an in-phase channel, amplitude response of a quadrature channel, phase response of a quadrature channel, base band frequency component, base band phase difference between the in-phase and quadrature channels, phase error between oscillator signals, and gain difference between the in-phase and quadrature channels. Further, compensation coefficients may be at least one of: a gain at a frequency of a direct current component of the in-phase channel and gain at a frequency of a direct current component of the quadrature channel.

The compensation coefficients may be determined only once before generation of compensated frequency domain symbols or they may be determined a plurality of times as a part of a compensation process.

In block 206, compensated frequency domain symbols are generated for at least one frequency pair by using the determined compensation coefficients.

Compensated frequency domain symbols may be generated by first determining real and imaginary parts of frequency components of a compensated symbol based on the compensation coefficients which were determined earlier by using equation (11) again. In the embodiment, in block 204, $A_{-n}, B_{-n}, C_n, D_n$, E and F were obtained by using generated transfer function values of in-phase and quadrature channels, and then compensation coefficients were determined. When equation (11) is used to generate compensated frequency domain symbols, compensation coefficients are know and $A_{-n}, B_{-n}, C_n, D_n$, E and F may be obtained as:

$$A_{-n}=c_{1,n}I_n+c_{2,n}I_{-n}+c_{3,n}Q_n+c_{4,n}Q_{-n}$$

$$B_{-n}=c_{5,n}I_n+c_{6,n}I_{-n}+c_{7,n}Q_n+c_{8,n}Q_{-n}$$

$$C_{-n}=c_{9,n}I_n+c_{10,n}I_{-n}+c_{11,n}Q_n+c_{12,n}Q_{-n}$$

$$D_{-n}=c_{13,n}I_n+c_{14,n}I_{-n}+c_{15,n}Q_n+c_{16,n}Q_{-n}$$

$$E=c_{0,1}I_{dc}+c_{0,2}Q_{dc}$$

$$F=c_{0,3}I_{dc}+c_{0,4}Q_{dc} \quad (11)$$

wherein $I_n$ denotes a real part of a negative frequency component (uncompensated) obtained from a successive sample (or a transmitted data symbol), $Q_n$ denotes an imaginary part of a negative frequency component (uncompensated) obtained from a successive sample (or a transmitted data symbol), $I_{-n}$ denotes a real part of a positive frequency component (uncompensated) obtained from a successive sample (or a transmitted data symbol), and $Q_{-n}$ denotes an imaginary part of a positive frequency component (uncompensated) obtained from a successive sample (or a transmitted data symbol), $Q_0$ denotes an imaginary part of the IFFT input at a frequency of a direct current component (uncompensated) obtained from a successive sample (or a transmitted data symbol), $I_0$ denotes a real part of the IFFT input at a frequency of a direct current component (uncompensated) obtained from a successive sample (or a transmitted data symbol), n denotes a frequency component of an available spectrum (see equation (1)), and $c_{x,n}$ denotes compensation coefficients determined by using a previous sample (the compensation coefficients may also be determined by using a test signal).

It should be noticed that several possibilities to carry out the embodiment exist. A separate test signal may be used to determine compensation coefficients or they may be determined by using a normal transmission signal. The terms "successive sample" and "previous sample" refer to the use of a normal transmission signal. If the compensation coefficients are determined by using a test signal, the frequency components are typically determined for a selected sample of a data symbol stream.

A DC component may be gain-scaled in a similar manner to other frequency components.

Then, a compensated frequency domain symbol may be expressed as follows:

$$S_{comp} = \begin{bmatrix} C_n + i \cdot D_n \\ C_{n-1} + i \cdot D_{n-1} \\ \ldots \\ C_1 + i \cdot D_1 \\ E + i \cdot F \\ A_{-1} + i \cdot B_{-1} \\ \ldots \\ A_{-n+1} + i \cdot B_{-n+1} \\ A_{-n} + i \cdot B_{-n} \end{bmatrix}, \quad (12)$$

wherein $A_{-n}$ denotes a real part of a negative frequency component of a compensated symbol (equation (11)), $B_{-n}$ denotes an imaginary part of the negative frequency component of a compensated symbol (equation (11)), $C_n$ denotes a real part of a positive frequency component of a compensated symbol (equation (11)), $D_n$ denotes an imaginary part of the positive frequency component of a compensated symbol (equation (11)), E denotes a real part of the IFFT input at a frequency of a direct current component of a compensated symbol (equation (11)), F denotes an imaginary part of the IFFT input at a frequency of a direct current component of a compensated symbol (equation (11)), i denotes an imaginary unit, and n denotes a frequency component (one symbol typically comprises a plurality of positive and negative frequency components, see equation (1)).

It should be noticed that equations (7) and (10) may be used instead of equation (11), but in most cases it would not be as practical a solution as using equation (11), since if equation (7) and (10) were used, the trigonometric functions of this equation should be calculated for each new symbol.

The steps/points, signaling messages and related functions described above in FIG. 2 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

The embodiment ends in block 208. The embodiment is repeatable: arrow 210 depicts one possibility, arrow 212 another possibility and arrow 214 yet another possibility for repeating the embodiment. The arrow 210 depicts the situation, when a compensated symbol is transmitted and a new compensated symbol is generated. The arrow 212 depicts the situation when compensation coefficients are re-determined. The arrow 214 depicts the case when compensation coefficients are re-determined due to transfer function change.

An example of an OFDM transmitter will be discussed by means of FIG. 3. An OFDM transmitter is used herein as an example of a transmitter to which embodiments are applicable. However, the embodiments may be applicable to any transmitter where signals are represented in the frequency domain in the digital base band, such as a single-carrier frequency division multiplexing (SC-FDM) transmitter.

A transmitter is taken herein as an example of an apparatus. Although the transmitter has been depicted as one entity, different modules may be implemented in one or more physical or logical entities.

It should be appreciated that the transmitter may comprise other units than those depicted in FIG. 3. However, they are irrelevant to the actual invention and, therefore, they need not be discussed in more detail herein.

In the transmitter of FIG. 3, signal is in digital base band from block 300 to 310, in analogue base band from block 310 to 314 and at radio frequency from block 314 to 322. The signal is represented in I and Q form between the base band blocks although only a single connection is shown between these blocks.

Block 300 generates modulated subcarriers by using for instance quadrature phase shift keying (QPSK) or quadrature amplitude modulation (QAM) modulation methods.

The block 302 generate compensated frequency domain symbols by using determined compensation coefficients.

The determination of compensation coefficients is explained in further detail by means of FIG. 4.

The block 304 carries out inverse Fourier transform for converting symbols from the frequency domain to the time domain. The inverse Fourier transform is explained in literature, for instance in Proakis, John G. and Manolakis, Dimitris G.: Introduction to Digital Signal Processing, 1988, Macmillan Publishing Company, page 242 and page 683 (Inverse Discrete Fourier Transform, IDFT).

The block 306 adds a cyclic prefix that is a part of a time domain symbol to its forepart. The block 308 is a pulse-shaping block and it attenuates undesired frequency spectrum spreading caused by the block 306.

The block 310 converts a signal from a digital to an analogue form. The block 312 is a low-pass filter attenuating undesired frequency components of the analogue signal.

The block 314 is an I/Q modulator up-converting a base band signal to a radio frequency determined by an oscillator 324.

The block 316 is a variable gain amplifier adjusting the power level of the radio frequency signal. A power amplifier 318 amplifies the signal to a desired transmission power level.

The filter block 320 attenuates out-of band spurious radio frequency components. The block 322 is an antenna which transmits the signal to a radio path.

The transmitter may also include means for generating transfer function values of in-phase and quadrature channels. Typically, a test signal is generated, for instance the IFFT block 404 is arranged to generate it. The test signal may include a single sub-carrier or a plurality of them. Another option is to use transmitted data for this purpose.

Two options for measuring transfer function values is provided: direct base band measurements (block 414), or RF measurements in which case a radio frequency (RF) signal is first down-converted (block 412) to a base band frequency, after which base band measurements are carried out in block 414.

Based on the measurement results, calculations according to equation (11) ((7), (10)) are carried out in block 416. In block 402/302 (FIG. 3) a signal to be transmitted is compensated by using the calculated compensation coefficients.

Blocks 400-404 are similar to corresponding block 300-304 in FIG. 3. Block 406 includes similar functions to blocks 306-312 in FIG. 3. Block 408 corresponds to block 314 in FIG. 3 and block 410 includes similar functions to blocks 316-322 in FIG. 3.

The apparatus, of which the transmitter is one example, may be located in a network element, node, host or user device, for example.

An embodiment provides a computer program embodied on a distribution medium, comprising program instructions which, when loaded into an electronic apparatus, constitute the apparatus as explained above.

The computer program may be in source code form, object code form, or in some intermediate form, and it may be stored in some sort of carrier or a distribution medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, implementation can be through modules of at least one chip set (e.g., procedures, functions, and so on) that perform the functions described herein. The software codes may be stored in a memory unit and executed by processors. The memory unit may be implemented within the processor or external to the processor. In the later case it can be communicatively coupled to the processor via various means, as is known in the art. Additionally, components of systems described herein may be rearranged and/or complimented by additional components in order to facilitate achieving the various aspects, etc., described with regard thereto, and they are not limited to the precise configurations set forth in given Figures, as will be appreciated by one skilled in the art.

The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a multimedia device, personal computer, game console, laptop (notebook), personal digital assistant, mobile station (mobile phone), and line telephone.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus, comprising:
   at least one processor; and
   at least one memory including computer program code,
   wherein the at least one memory and the computer program code are configured to, with the at least one processor, cause the apparatus at least to
   generate transfer function values of in-phase and quadrature channels;
   determine compensation coefficients based on the generated transfer function values of the in-phase and quadrature channels; and
   generate compensated frequency domain symbols for at least one frequency pair by using the compensation coefficients for compensating for frequency dependent distortion of a base band circuit.

2. The apparatus of claim 1, wherein the at least one memory and the computer program code are further configured to, with the at least one processor, cause the apparatus at least to generate the transfer function values by measuring a test signal.

3. The apparatus of claim 1, wherein the at least one memory and the computer program code are further configured to, with the at least one processor, cause the apparatus at least to generate the compensated frequency domain symbols for a single frequency component located between the at least one frequency pair.

4. The apparatus of claim 1, wherein the at least one memory and the computer program code are further configured to, with the at least one processor, cause the apparatus at least to determine compensation coefficients by using at least one of an amplitude response of the in-phase channel, a phase response of the in-phase channel, an amplitude response of the quadrature channel, a phase response of the quadrature channel, a base band frequency component, a base band phase difference between the in-phase and quadrature channels, a phase error between oscillator signals, and a gain difference between the in-phase and quadrature channels.

5. The apparatus of claim 1, wherein the at least one memory and the computer program code are further configured to, with the at least one processor, cause the apparatus at least to determine the compensation coefficients by using at least one of a gain at a frequency of a direct current component of the in-phase channel, and a gain at a frequency of a direct current component of the quadrature channel.

6. The apparatus of claim 1, wherein the at least one memory and the computer program code are further configured to, with the at least one processor, cause the apparatus at least to determine the compensation coefficients by comparing differences between the generated transfer function values of the in-phase and quadrature channels.

7. The apparatus according to claim 1, wherein the apparatus is a transmitter.

8. The apparatus according to claim 1, wherein the apparatus is a chip set.

9. A method, comprising:
   generating transfer function values of in-phase and quadrature channels;
   determining compensation coefficients based on the generated transfer function values of the in-phase and quadrature channels; and
   generating compensated frequency domain symbols for at least one frequency pair by using the compensation coefficients for compensating for frequency dependent distortion of a base band circuit.

10. The method of claim 9, further comprising:
    generating the transfer function values by measuring a test signal.

11. The method of claim 9, further comprising:
    generating the compensated frequency domain symbols for a single frequency component located between the at least one frequency pair.

12. The method of claim 9, further comprising:
    determining the compensation coefficients by using at least one of a real part of a negative frequency component, an imaginary part of the negative frequency component, a real part of a positive frequency component, an imaginary part of the positive frequency component, a base band frequency component, a base band phase difference between in-phase and quadrature signals, a phase error between oscillator signals, and a gain difference between in-phase and quadrature signals.

13. The method of claim 9, further comprising:
    determining the compensation coefficients by using at least one of a real part of a frequency component at a frequency of a direct current component, and an imaginary part of a frequency component at a frequency of a direct current component.

14. The method of claim 9, further comprising:
    determining the compensation coefficients by comparing differences between the generated transfer function values of the in-phase and quadrature channels.

15. A computer program product, embodied on a non-transitory computer-readable storage medium, encoding a computer program of instructions for executing a computer process, the process comprising:
    generating transfer function values of in-phase and quadrature channels;
    determining compensation coefficients on a basis of the generated transfer function values of the in-phase and quadrature channels; and generating compensated frequency domain symbols for at least one frequency pair by using the compensation coefficients for compensating for frequency dependent distortion of a base band circuit.

16. The computer program product of claim 15, further comprising:
    generating the transfer function values by measuring a test signal.

17. The computer program product of claim 15, further comprising:
    generating the compensated frequency domain symbols for a single frequency component located between the at least one frequency pair.

18. The computer program product of claim 15, further comprising:
    determining the compensation coefficients by using at least one of a real part of a negative frequency component, an imaginary part of the negative frequency component, a real part of a positive frequency component, an imaginary part of the positive frequency component, a base band frequency component, a base band phase difference between in-phase and quadrature signals, a phase error between oscillator signals, and a gain difference between in-phase and quadrature signals.

19. The computer program product of claim 15, further comprising:
    determining the compensation coefficients by using at least one of a real part of a frequency component at a frequency of a direct current component, and an imaginary part of a frequency component at a frequency of a direct current component.

20. The computer program of claim 15, further comprising:
    determining the compensation coefficients by comparing differences between the generated transfer function values of the in-phase and quadrature channels.

21. An apparatus, comprising:
    processing means for
        generating transfer function values of in-phase and quadrature channels;
        determining compensation coefficients on a basis of the generated transfer function values of in-phase and quadrature channels; and
        generating compensated frequency domain symbols for at least one frequency pair by using the compensation coefficients for compensating for frequency dependent distortion of a base band circuit.

22. The apparatus of claim 21, wherein the processing means is further for generating the transfer function values by measuring a test signal.

23. The apparatus of claim 21, wherein the processing means is further for generating the compensated frequency domain symbols for a single frequency component located between the at least one frequency pair.

24. The apparatus of claim 21, wherein the processing is further for determining the compensation coefficients by using at least one of an amplitude response of an in-phase channel, a phase response of the in-phase channel, an amplitude response of a quadrature channel, a phase response of the quadrature channel, a base band frequency component, a base band phase difference between in-phase and quadrature channels, a phase error between oscillator signals, and a gain difference between in-phase and quadrature channels.

25. The apparatus of claim 21, wherein the processing means is further for determining the compensation coefficients by using at least one of a gain at a frequency of a direct current component of the in-phase channel and a gain at a frequency of a direct current component of the quadrature channel.

26. The apparatus of claim 21, wherein the processing means is further for determining the compensation coefficients by comparing differences between the generated transfer function values of the in-phase and quadrature channels.

27. The apparatus according to claim 21, wherein the apparatus comprises a transmitter.

28. The apparatus according to claim 21, wherein the apparatus comprises a chip set.

* * * * *